United States Patent
Troy et al.

(10) Patent No.: US 11,614,743 B2
(45) Date of Patent: Mar. 28, 2023

(54) SYSTEM AND METHOD FOR NAVIGATING A SENSOR-EQUIPPED MOBILE PLATFORM THROUGH AN ENVIRONMENT TO A DESTINATION

(71) Applicant: The Boeing Company, Chicago, IL (US)

(72) Inventors: James J. Troy, Issaquah, WA (US); Gary E. Georgeson, Tacoma, WA (US); Scott W. Lea, Renton, WA (US)

(73) Assignee: The Boeing Company, Arlington, VA (US)

( * ) Notice: Subject to any disclaimer, the term of this patent is extended or adjusted under 35 U.S.C. 154(b) by 43 days.

(21) Appl. No.: 15/905,299

(22) Filed: Feb. 26, 2018

(65) Prior Publication Data
US 2019/0265721 A1      Aug. 29, 2019

(51) Int. Cl.
*G05D 1/02*      (2020.01)
*G01C 21/00*     (2006.01)
*G01C 21/20*     (2006.01)
*G01S 17/93*     (2020.01)
*G01S 17/42*     (2006.01)
*G05D 1/00*      (2006.01)
*G06K 7/14*      (2006.01)
(Continued)

(52) U.S. Cl.
CPC ......... *G05D 1/0246* (2013.01); *G01C 21/005* (2013.01); *G01C 21/206* (2013.01); *G01S 17/42* (2013.01); *G01S 17/93* (2013.01); *G05D 1/0088* (2013.01); *G06K 7/10722* (2013.01); *G06K 7/1417* (2013.01); *G06T 7/70* (2017.01); *G05D 2201/0211* (2013.01); *G05D 2201/0216* (2013.01); *G05D 2201/0218* (2013.01); *G06T 2207/10152* (2013.01); *G06T 2207/30204* (2013.01)

(58) Field of Classification Search
CPC ...... G06T 7/70; G01C 21/005; G01C 21/206; G01S 17/42; G01S 17/93; G05D 1/0088
See application file for complete search history.

(56) References Cited

U.S. PATENT DOCUMENTS 7,643,893 B2    1/2010  Troy et al.
8,214,098 B2    7/2012  Murray et al.
(Continued)

OTHER PUBLICATIONS

Troy et al., "Closed-Loop Motion Capture Feedback Control of Small-Scale Aerial Vehicles," AIAA Infotech@Aerospace 2007 Conference and Exhibit (2007).

*Primary Examiner* — James M McPherson
*Assistant Examiner* — Bakari Underwood
(74) *Attorney, Agent, or Firm* — Walters & Wasylyna LLC

(57) ABSTRACT

A method for navigating a sensor-equipped mobile platform through an through an environment to a destination, the method including: capturing a first image in a first state of illumination; capturing a second image in a second state of illumination; generating a difference image from said first image and said second image; locating an imaging target based on said difference image, said imaging target including a machine-readable code embedded therein, said machine-readable code including navigation vector data; extracting said navigation vector data from said machine-readable code; and using said extracted navigation vector data to direct the navigation of the mobile platform through the environment to a destination.

20 Claims, 14 Drawing Sheets

(51) Int. Cl.
 *G06K 7/10* (2006.01)
 *G06T 7/70* (2017.01)

(56) References Cited

U.S. PATENT DOCUMENTS

| | | | | |
|---|---|---|---|---|
| 2007/0276558 | A1* | 11/2007 | Kim | G05D 1/0236 |
| | | | | 701/23 |
| 2011/0039573 | A1* | 2/2011 | Hardie | G01C 21/005 |
| | | | | 455/456.1 |
| 2013/0212130 | A1* | 8/2013 | Rahnama | H04L 41/24 |
| | | | | 707/792 |
| 2015/0332079 | A1* | 11/2015 | Park | H04N 1/32128 |
| | | | | 235/462.09 |
| 2016/0300354 | A1* | 10/2016 | Fetzer | G01B 11/14 |
| 2018/0281191 | A1* | 10/2018 | Sinyavskiy | A47L 11/4066 |
| 2018/0364740 | A1* | 12/2018 | Collins | G05D 1/0684 |
| 2019/0138030 | A1* | 5/2019 | Wu | G05D 1/0038 |

* cited by examiner

CONTINUED TO FIG 11B

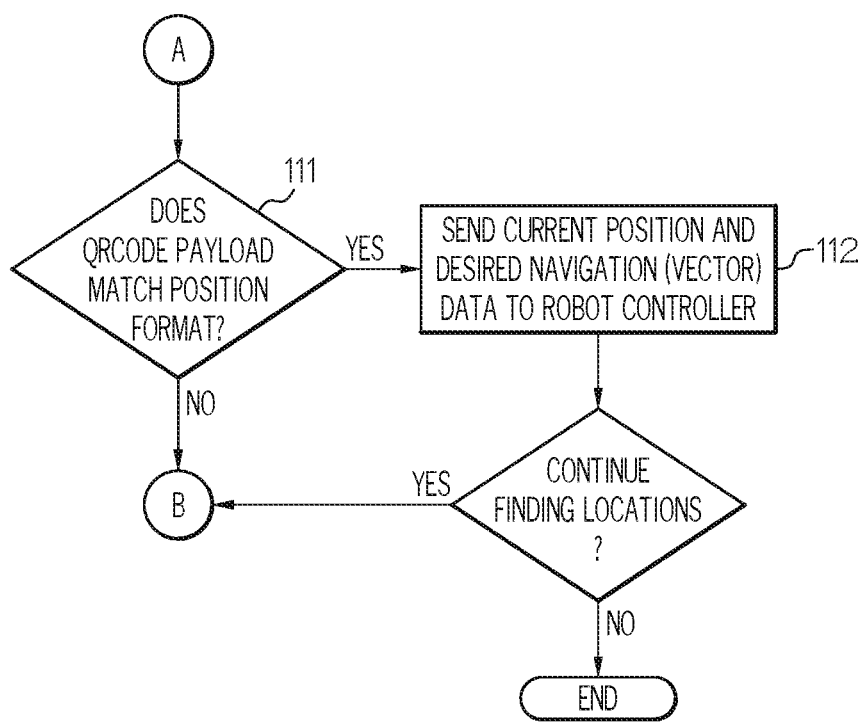
FIG. 11B
CONTINUED FROM FIG 11A

SYSTEM AND METHOD FOR NAVIGATING A SENSOR-EQUIPPED MOBILE PLATFORM THROUGH AN ENVIRONMENT TO A DESTINATION

FIELD

The present application relates to the field of systems and methods for navigating a sensor-equipped mobile platform through an environment to a destination.

BACKGROUND

For existing vector field navigation, navigation data is held internally in a memory of a robot, which is then separately registered with the environment by using some other localization process or system. Such robots need a high level of programming to navigate an environment. These issues with navigation make it challenging to use general purpose robots.

Accordingly, those skilled in the art continue with research and development in the field of systems and methods for navigating a sensor-equipped mobile platform through an environment to a destination.

SUMMARY

In one embodiment, a method for navigating a sensor-equipped mobile platform through an environment to a destination, the method includes: capturing a first image in a first state of illumination; capturing a second image in a second state of illumination; generating a difference image from said first image and said second image; locating an imaging target based on said difference image, said imaging target including a machine-readable code embedded therein, said machine-readable code including navigation vector data; extracting said navigation vector data from said machine-readable code; and using said extracted navigation vector data to direct the navigation of the mobile platform through the environment to a destination.

In another embodiment, a system for navigating a sensor-equipped mobile platform through an environment to a destination includes: a plurality of imaging targets at a plurality of locations, each imaging target including a machine-readable code, each said machine-readable code including navigation vector data; and a mobile platform including an imaging device and a computing device. The computing device is configured to: capture a first image in a first state of illumination using said imaging device; capture a second image in a second state of illumination using said imaging device; generate a difference image from said first image and said second image; locate an imaging target of said plurality of imaging targets based on said difference image; extract said navigation vector data from said machine-readable code of said located imaging target; and use said extracted navigation vector data to direct the navigation of said mobile platform.

Other embodiments of the disclosed system and method for navigating a sensor-equipped mobile platform through an environment to a destination will become apparent from the following detailed description, the accompanying drawings and the appended claims.

BRIEF DESCRIPTION OF THE DRAWINGS

FIGS. 11A and 11B are flow charts representing an exemplary method of navigation a sensor-equipped mobile platform to a destination according to an exemplary embodiment of the present description.

DETAILED DESCRIPTION

Disclosed herein is a method and system for navigating a sensor-equipped mobile platform through an environment to a destination. Various devices, steps, and computer program products may be employed in conjunction with the practice of various aspects of the present disclosure.

As used herein, the term "computing device" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

Figure 1A:
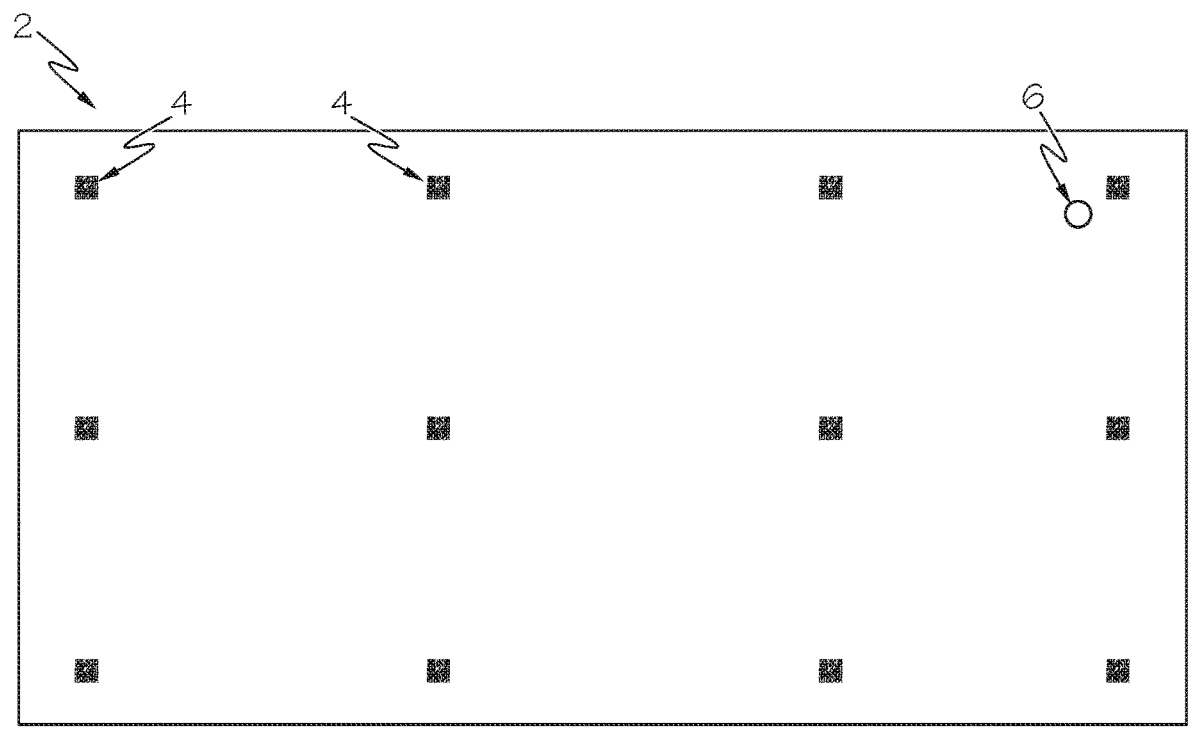
FIG. 1A is a schematic representing a system using machine-readable targets for navigating a sensor-equipped mobile platform through an environment to a destination according to an embodiment of the present description.
Figure 3A:
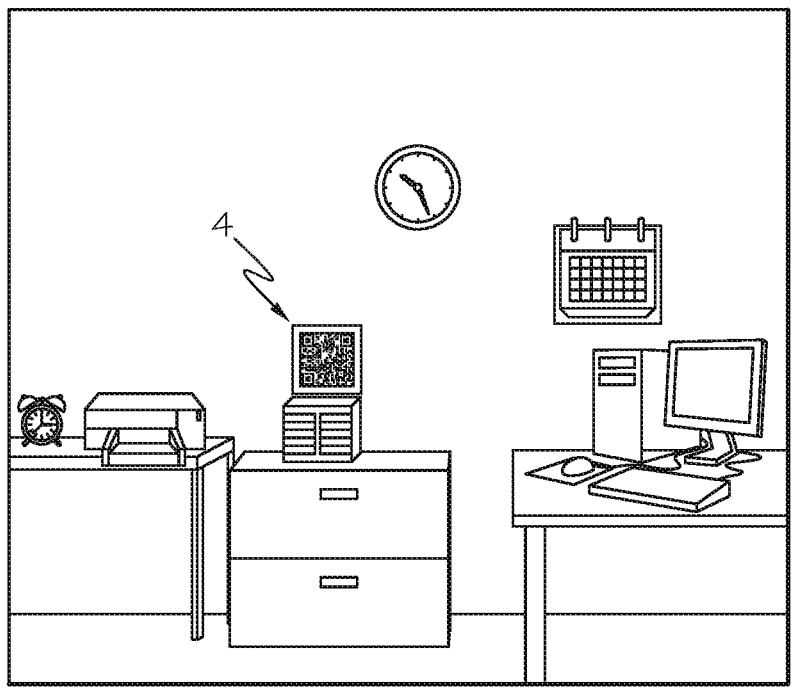
FIG. 3A is an illustration representing an image taken by an imaging device in a non-illuminated state.
Figure 3B:
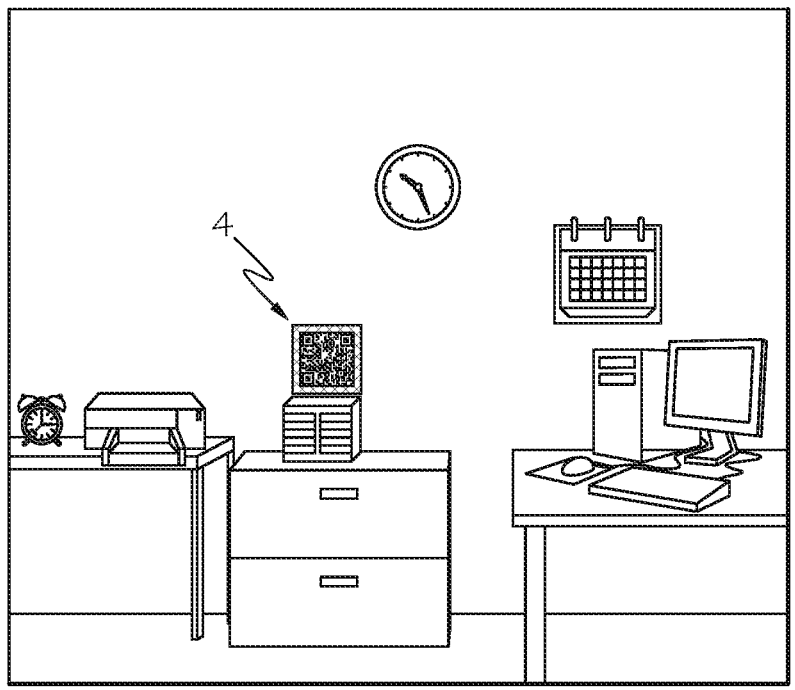
FIG. 3B is an illustration representing an image taken by an imaging device in an illuminated state.

Referring now to FIG. 1A, a system 2 for navigating a sensor-equipped mobile platform through an environment to a destination includes a plurality of imaging targets 4 at a plurality of locations and a sensor-equipped mobile platform 6. As shown in FIGS. 3A and 3B, each imaging target 4 includes a machine-readable code 8 and a passive marker 10. The imaging targets are each positioned on a surface of an object or otherwise positioned within the environment of the system.

The machine-readable code 8 is an optically readable code, such as a Quick Response (QR) code. However, QR codes are just one example of an optically-readable code. While QR code patterns will be used for the description of implementations herein, other optically-readable codes may be employed, such as UPC standard bar codes, Data Matrix (ECC 200) 2D matrix bar codes, and Maxi Code 2D matrix bar codes (used by UPS, public domain). In an aspect, the machine-readable code is dynamic, e.g. such as by being formed using e-ink, and therefore the machine-readable code can be updated from a remote location. As shown in FIGS. 3A and 3B, the illustrated imaging target 4 is a QR code.

The passive markers 10 of the imaging targets 4 contain, for example, retro-reflective materials that are capable of reflecting light back to the source when displayed under a controlled light source. For example, the reflective portion of the passive markers comprises: retro-reflective tape, reflective fabric tape, or reflective tape including microspheres. In alternate embodiments, the reflective portion includes other types of passive markers that may show up differently under different lighting conditions. In an example, passive markers that fluoresce under a blacklight (such as ultraviolet or infrared paint) are used. As shown in FIGS. 3A and 3B, the illustrated passive marker 10 is a retroreflective passive marker circumscribing a QR code. FIG. 3A shows the imaging target in a non-illuminated state, and FIG. 3B shows the imaging target an illuminated state, causing a distinct difference in the appearance of the retroreflective passive marker between the non-illuminated state and the illuminated state.

The process of positioning the machine-readable codes and passive markers of the imaging targets is achieved through various implementations. In an example, the machine-readable codes and passive markers are manufactured and entrenched into the surfaces of objects. In another example, the machine-readable codes and passive markers are affixed onto a surface through the application of stickers. It may be noted, however, that various other implementations may also be used to affix machine-readable codes and passive markers to the surface of the objects. In another example, passive markers and machine-readable code are manufactured together as a single unit (e.g. sticker) or as separate units, which are then applied to a surface of an object.

Figure 2:
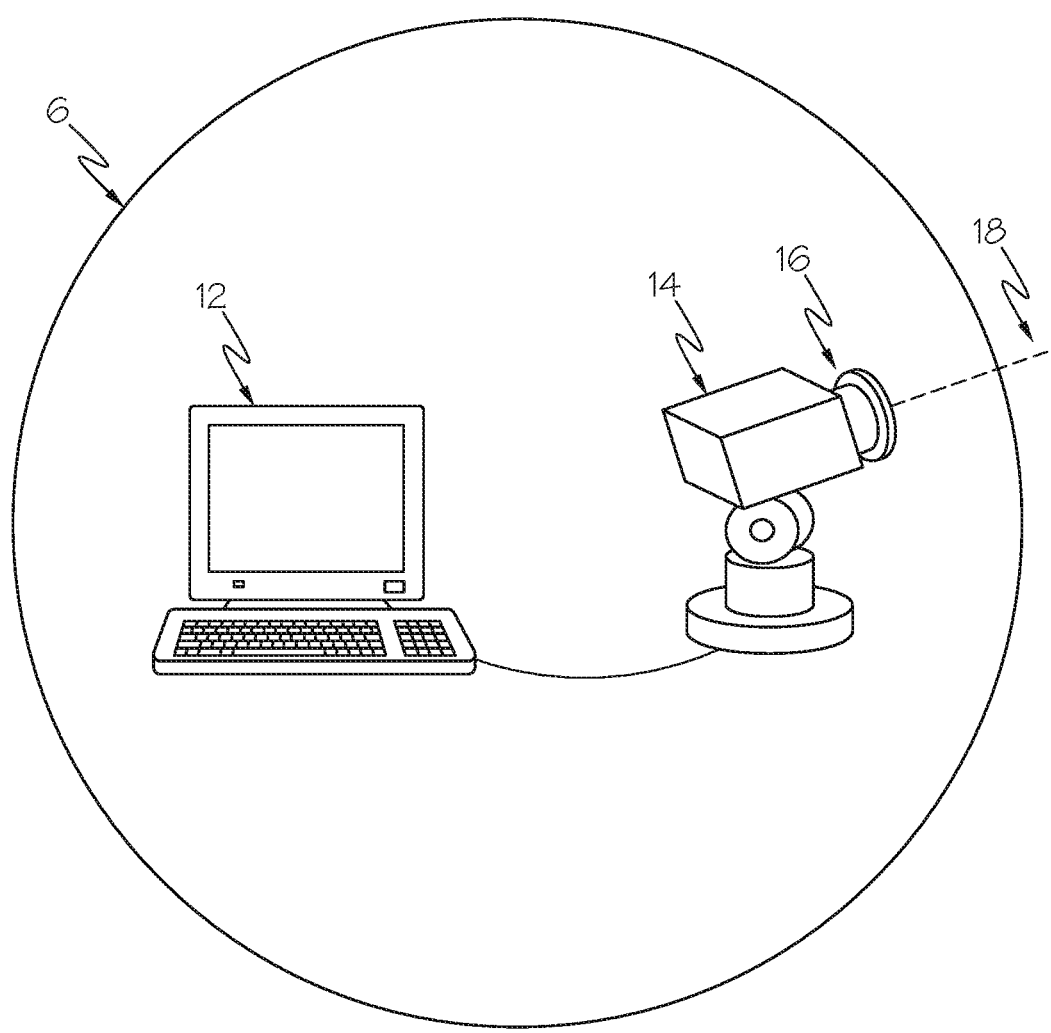
FIG. 2 is a schematic representing a sensor-equipped mobile platform of the system of FIG. 1.

The mobile platform 6 includes any robot, vehicle or other mobile device or system that utilizes navigation. As shown in FIG. 2, the mobile platform 6 includes an imaging device 12 and a computing device 14.

In an aspect, the imaging device 12 includes a camera, such as a video camera. In an aspect, the imaging device has automated zoom capabilities. In yet another aspect, the imaging device is supported on a pan-tilt mechanism, and both the imaging device and the pan-tilt mechanism are operated by the computing device 14. The pan-tilt mechanism is controlled to positionally adjust the imaging device to selected angles around a vertical, azimuth (pan) axis and a horizontal, elevation (tilt) axis. In an example, the computing device is integrated with the imaging device, and control of the pan-tilt mechanism and therefore, the orientation of the imaging device is controlled using the computing device.

In an aspect, the mobile platform 6 further includes an illumination device 16, such as a ring light. The illumination device includes an electrically-powered (e.g., battery powered) light source or any other light source with similar functionality. In the illustrated example, the illumination device is a ring light surrounding a lens of the imaging device. In an aspect, the illumination device includes two illumination states, e.g. an on state and an off state. In other words, the illumination device is either activated or deactivated. In the on-state, the illumination device provides illumination; and, in the off-state, the illumination device provides no illumination.

In an aspect, the mobile platform further includes a laser range meter that transmits a laser beam 18 as shown in FIG. 2. The laser range meter is configured to measure a distance to an object. The laser range meter has a laser and a unit configured to compute distances based on the laser light detected in response to laser light reflected on the object. For example, the laser range meter is incorporated with the imaging device. In another example, the laser range meter is separate from the imaging device. In an aspect, the system further includes three-dimensional localization software loaded into the computing device for determining a position of the mobile platform relative to the imaging targets. In one embodiment, multiple imaging targets (e.g. three or more imaging targets) are utilized to determine the relative position and orientation of the mobile platform. In an aspect, the three-dimensional localization software uses the imaging targets and the laser range meter measurements to determine the location (position and orientation) of the mobile platform relative to the imaging targets. In another embodiment, an estimate of relative position and orientation of the mobile platform can be acquired from a single target by using the internal registration marks in the target, such as those in a QRcode.

Figure 4A:
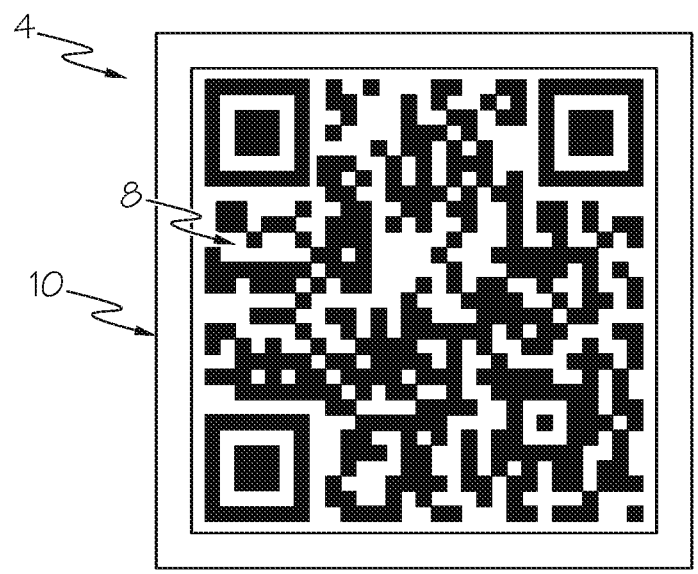
FIG. 4A is an illustration representing an imaging tag taken by an imaging device in a non-illuminated state.
Figure 4B:
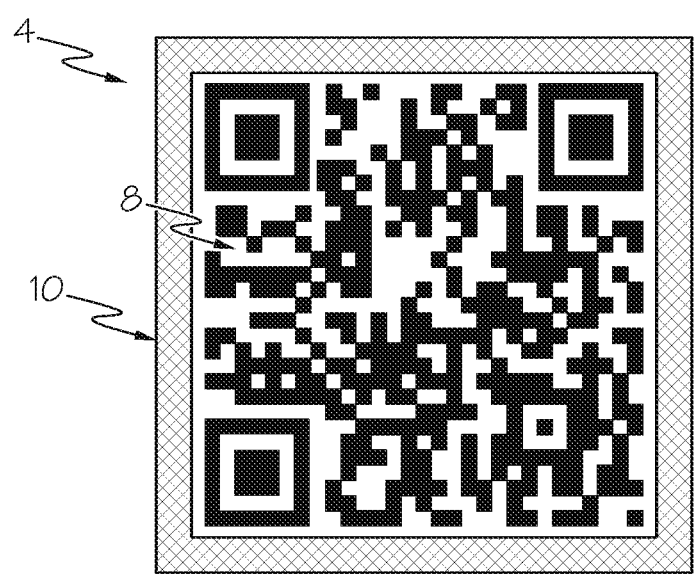
FIG. 4B is an illustration representing an imaging tag taken by an imaging device in an illuminated state.

In an aspect, the computing device directs the imaging device to capture a non-illuminated first image. The imaging device captures the non-illuminated first image (shown in FIG. 3A), which includes an image of an imaging target 4 (close-up shown in FIG. 4A) while having the illumination device in the off-state. The non-illuminated first image is then sent and stored in a database or memory of the computing device for post-processing. Then the computing device directs the imaging device to capture an illuminated second image, by utilizing the illumination device that is activated to the illumination on-state. The imaging device captures the illuminated second image (shown in FIG. 3B), which includes an image of the imaging target 4 (close-up shown in FIG. 4B) while having the illumination device in the on-state. The illuminated second image is then sent and stored in a database or memory of the computing device for post-processing.

Figure 5:
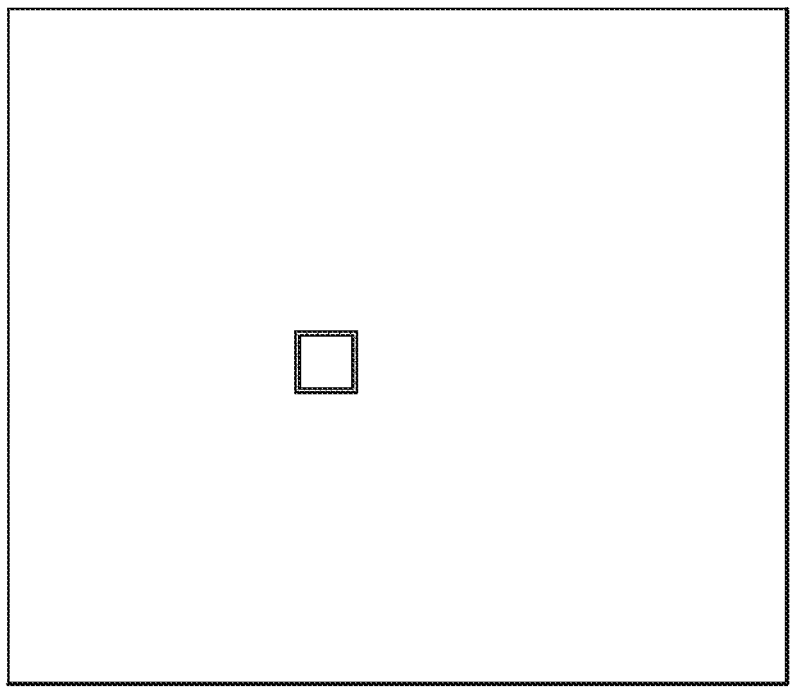
FIG. 5 is an illustration representing a difference image generated from the images of FIGS. 3A and 3B.

Because the imaging target is circumscribed by a retro-reflective passive marker, the illumination from the illumination device causes the imaging target to stand out and reflect the light back to the imaging device. Due to the passive marker of the imaging target having a significantly different appearance in the illuminated and non-illuminated states, the position of the imaging target is readily located by comparison of the first and second images. FIG. 5 depicts an illustration of an exemplary difference image generated from the first and second images illustrated in FIGS. 3A and 3B. The generated difference image may be used to determine the location of the imaging target. In an implementation, the generation of a difference image may be achieved through the procedures described as follows.

First, a distortion function correction is applied to each captured image. Second, a difference image is computed that represents the differences between the illuminated image and the non-illuminated image. Third, the difference image is segmented into separate areas, which include filtering using size, color, shape, or other parameters. Image segmentation means defining a group of pixels with a specific characteristic. In accordance with one implementation, pixels of a specific color and intensity that are next to each other (i.e. contiguous regions) are found. The difference image may have some small artifacts (such a subtle edge outlines) that will be filtered out. This filtering is done using, for example, a blur filter and an intensity threshold filter. After the image has been segmented, the computing device calculates the centroid for each segmented region. The centroid is the average X pixel coordinate and average Y pixel coordinate for that region. These X-Y coordinate pairs are used to compute the differences from the X-Y coordinate pair for the center of the image.

Referring again to FIG. 5, once average pixel coordinates for each segmented region have been calculated, respective pan and tilt angles for the centroid position of each segmented region in the image may be computed. These are the pan and tilt angles that will be used to direct the pan-tilt mechanism used to orient the laser range finder to the center of the imaging target in order to acquire the distance to the target. The method for aiming at the imaging target uses the pixel offsets for each of the centroids from the center of the image, the current field-of-view angle of the imaging device, and the distance to the target at the center of the image to compute offset pan and offset tilt angles. Automated local positioning measurements of the locations corresponding to the centroids of the segmented regions are performed using the offset pan and offset tilt angles. From the measured distance and the pan and tilt angles, the relative Cartesian coordinates (X,Y,Z) position from the target to the pan-tilt mechanism can be computed.

Figure 6A:
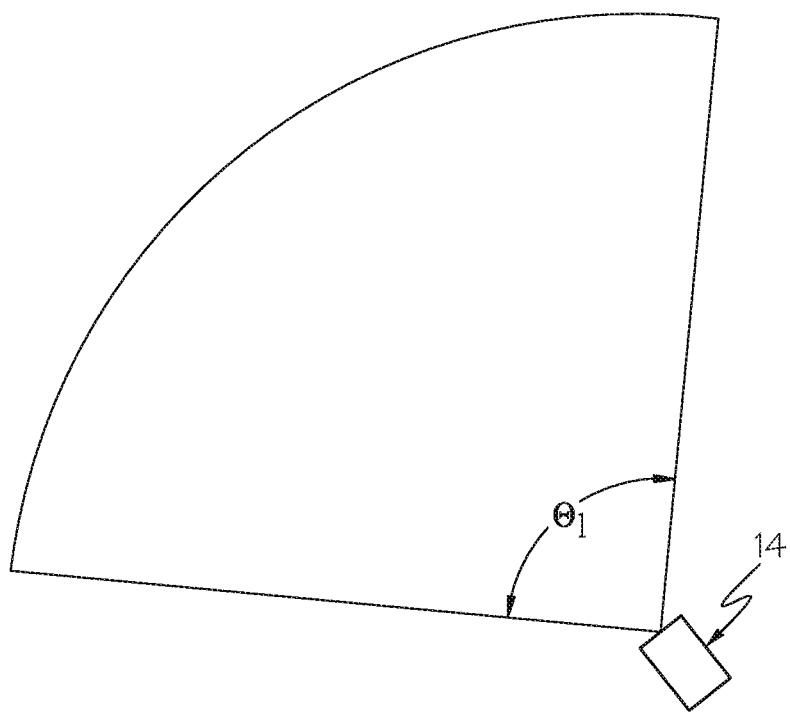
FIGS. 6A to 6C are schematics representing a process for location an imaging tag.
Figure 6B:
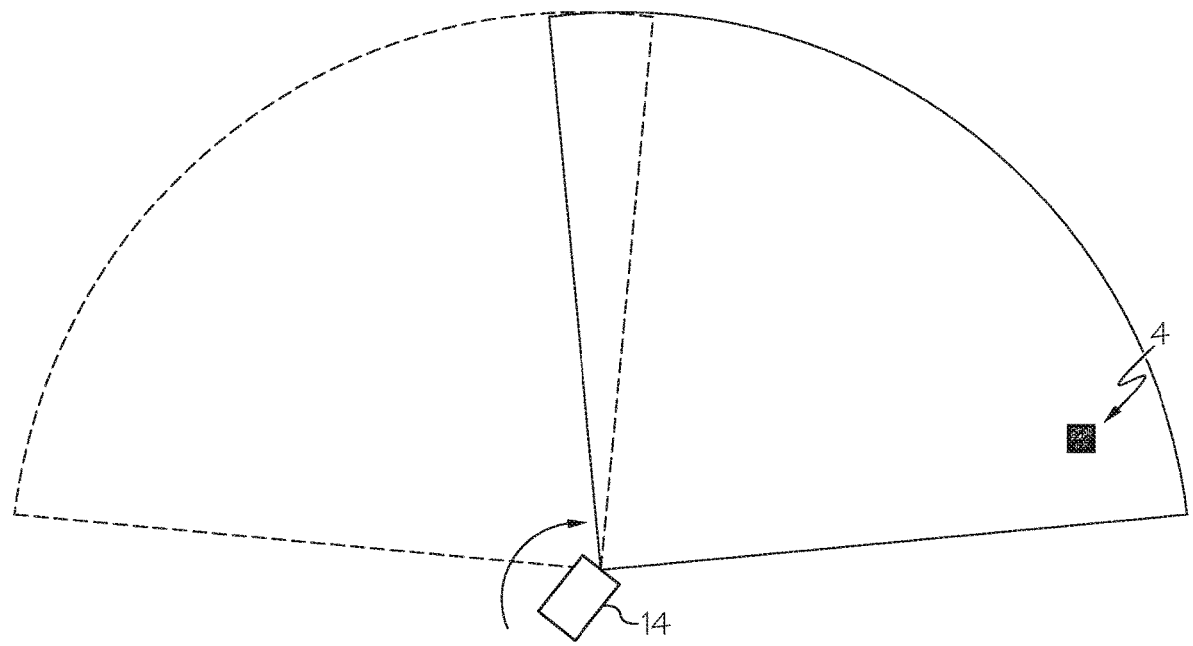
Figure 6C:
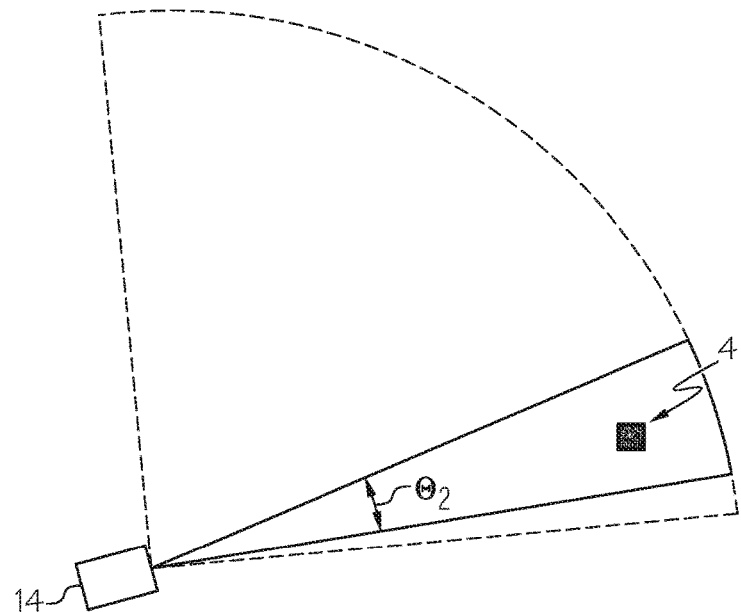

FIGS. 6A-6C illustrate a search and scanning process for locating an imaging target 4. The imaging device 14 is initially aimed with a wide field-of-view angle. The imaging target 4 may be located anywhere in the environment, and in general may not be known to the mobile platform 6 before the process begins, which means that in order to read the imaging target 4, the mobile platform 6 may need to the imaging target 4 first. The process for locating the imaging target 4 involves acquiring a mosaic of slightly overlapping wide-angle images of the environment in which the mobile platform 6 is set up. This image acquisition involves changing the pan and tilt angles of the pan-tilt mechanism and setting an appropriate field-of-view (zoom value) to take pairs of images. The process of changing the orientation with the pan-tilt mechanism and taking pairs of images continues until an imaging target 4 has been located.

As seen in FIG. 6A, the process starts by setting a wide field-of-view angle (01) and capturing a first image with the imaging device 14 while having the illumination device in an of state and capturing a second image with the same field of view with the imaging device 14 while having the illumination device in an on state. As described in FIG. 5, a difference image may then be computed to determine if an imaging target 4 is within the current field-of-view of the imaging device, if an imaging target is not found, an aim direction of the imaging device is changed using the pan-tilt mechanism to rotate the imaging device to view another region in the environment, where the new field-of-view region partially overlaps the previous field-of-view region (shown in FIG. 6B), after which the two images (illuminated and non-illuminated) of the environment are captured. This search process involving rotation of the aim direction and cycling of the illumination lights continues until an imaging target has been located in the environment. As shown in FIG. 6C, once an imaging target has been located, the computing device instructs the pan-tilt mechanism to aim the imaging device at the center region of the imaging target, zoom in on the imaging target (based on the extents determined in the image processing step), and then acquire a close-up (zoomed-in) image of the imaging target. From this zoomed-in image, the payload within the imaging target is read or decoded (which may be in the form of a QR code, DataMatrix code, barcode, or some other machine-readable form). At this point, pan-tilt angles and a distance reading of the center point of the imaging target is acquired by the measurement instrument. If the payload cannot be decoded into a usable format, the imaging target is rejected, and the process continues the search from where it left off until a valid imaging target has been located. In alternate embodiments, the re-orientation of the imaging device aim direction, zoom-in, and attempt at decoding the payload may be instructed to take place immediately after an imaging target has been located.

Figure 1B:
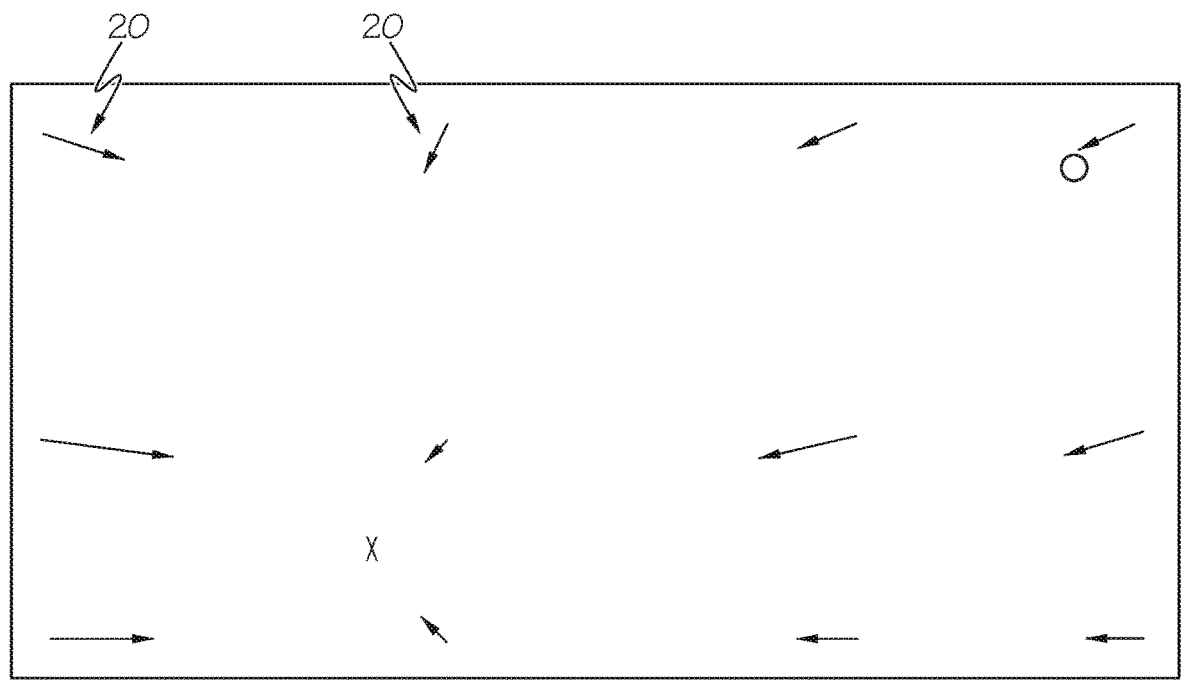
FIG. 1B is a schematic representing navigation vector data of a payload of machine-readable targets of an imaging tag of FIG. 1A.
Figure 1C:
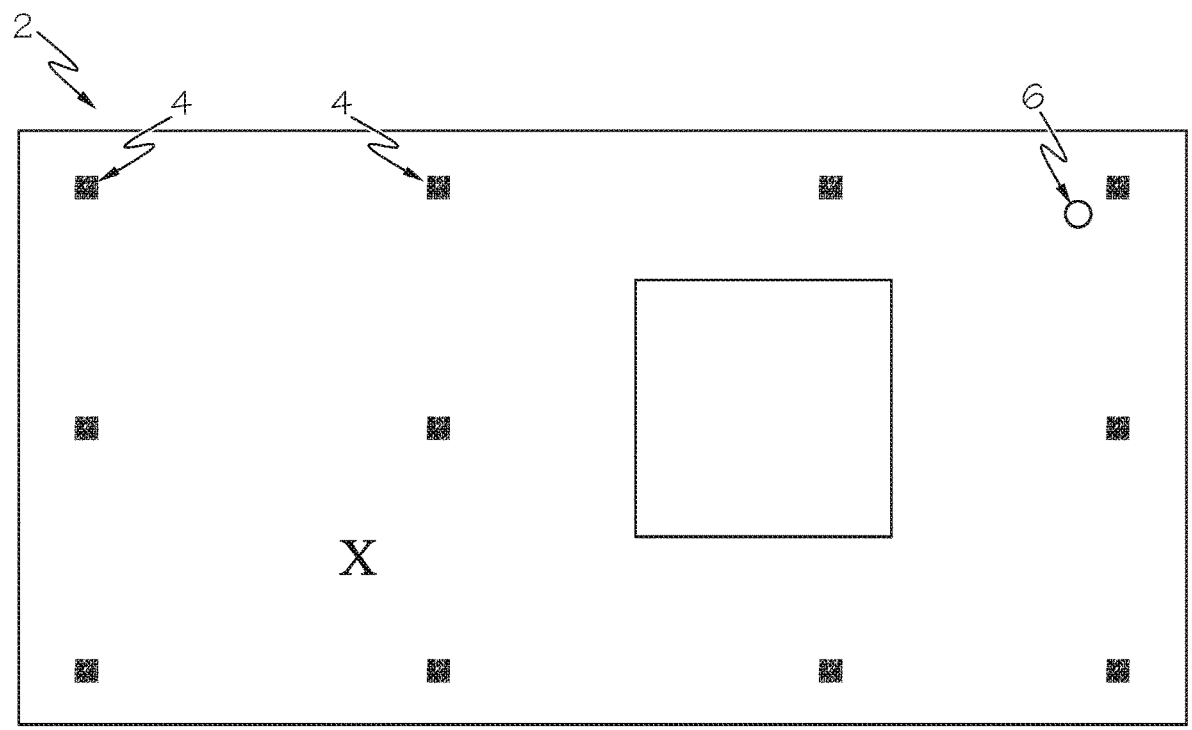
FIG. 1C is a schematic representing a system using machine-readable targets for navigating a sensor-equipped mobile platform through an environment to a destination according to another embodiment of the present description.
Figure 1D:
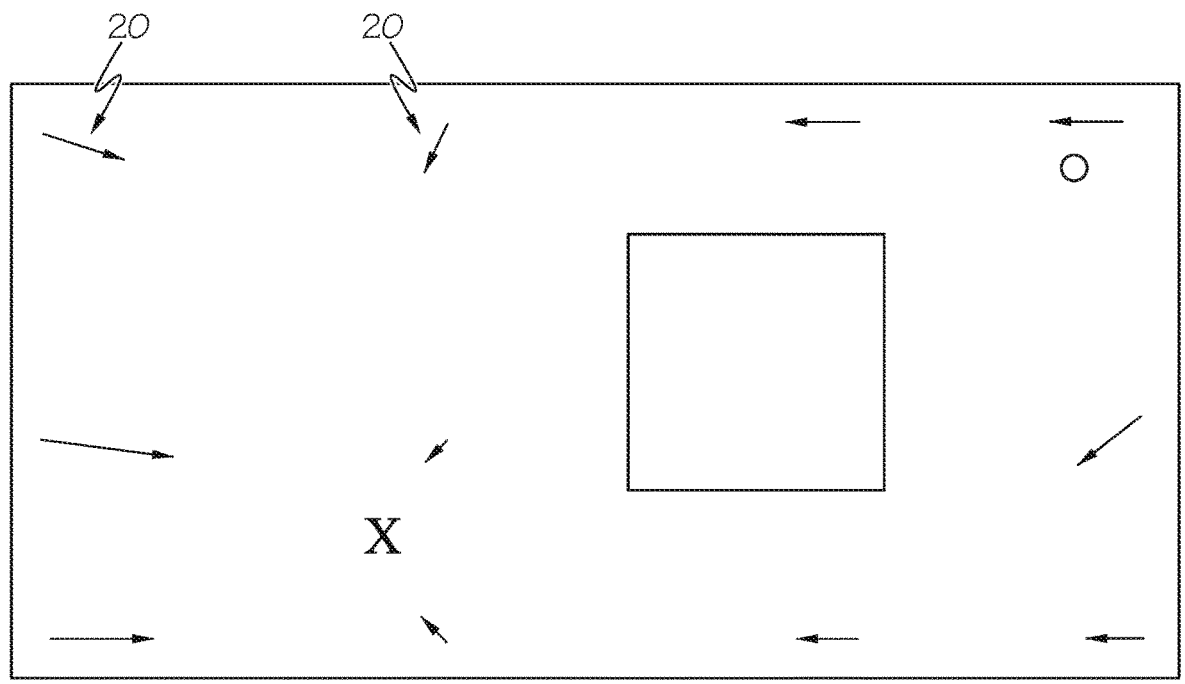
FIG. 1D is a schematic representing navigation vector data of a payload of machine-readable targets of an imaging tag of FIG. 1C.

Referring back to FIGS. 1A and 1B, navigation vector data 20 is stored in a data payload region of the machine-readable code that is obtained or decoded from the imaging targets 4. The navigation vector data includes information corresponding to a direction through the environment to a destination that will be used to direct navigation of the mobile platform. In an example, the navigation vector data includes information in terms of a local coordinate system for indicating a navigation direction, such as specific coordinates defined in a coordinate system with Cartesian coordinates x, y, and z. The imaging device decodes the machine-readable code to extract the navigation vector data therefrom, which is then sent and stored in a database or memory of the computing device for use in directing the navigation of the mobile platform. In an aspect, the machine-readable code includes information corresponding to the current location of the imaging target. In another aspect, the navigation vector data extracted from the machine-readable code may further include information corresponding to a distance, velocity, and/or travel time that is also used to direct navigation of the mobile platform. In another aspect, the payload data further includes a unique identifier string encoded into the data payload region of the machine-readable code. Additionally, other signal data can also be embedded in the machine-readable code to initiate location specific tasks. FIGS. 1C and 1D show a variation in which a mobile platform is navigated using point-to-point navigation, whereas FIGS. 1A and 1B shows direct path to the goal. In the case of FIGS. 1C and 1D, there may be an obstruction preventing a direct path to the goal, and a navigation vector from the imaging target may direct the mobile platform to another imaging target rather than to the goal.

According to an aspect of the present description, the addition of embedded directional information to imaging targets that a mobile device identifies, enables the directing of the mobile device in accordance with the directional info in the imaging targets. Field vector information is embedded in and acquired from an imaging target, and not retrieved from a remote database based on look-up information displayed on the imaging target, and the field vector information is used to direct the mobile platform using the field vector info through the environment to the identified direction/destination. By embedding within the imaging target the actual field vector information (as opposed to just look-up information for looking up a field vector retrieved from a remote database located outside the environment), the mobile device can obtain navigation information on site solely relying on the acquired image of the imaging target, without requiring wireless communications with a system or remote database located outside the environment.

According to an aspect of the present description, the mobile platform with an imaging device captures images in both a non-illuminated state and illuminated state, to identify from a difference image an imaging target(s), and to extract from an optically readable marker in the imaging target embedded field vector information, where the field vector information is acquired from the imaging target and not retrieved from a remote, external database. The mobile platform then uses the field vector directional information to direct the mobile platform in the identified direction.

According to another aspect of the present description, the system provides a series of machine-readable imaging tags positioned (e.g. placed/painted/etched/applied) on a surface of a target object or within the environment to guide mobile platforms (e.g. robotic vehicles) on a pre-defined path. Each imaging tag contains the desired navigation direction along with, for example, current location, distance, velocity, travel time, which is used to guide the mobile platform along a path with minimal path related, low-level programming. In this navigation process, the environment tells the robot where it is and where to go next, with only high-level commands from humans required.

For conventional dynamic programming problems and vector field navigation, data was typically held internally in a memory of a robot, which was separately registered with the environment by using some other calibration process or system. In comparison, according to the present description, this registration step can be eliminated by putting vector field data directly on the imaging target. In this way the path programming is done up front and printed on the surface of the imaging target. Any robot setup to read this type of path plan encoding can execute the navigation task without additional programming required. The machine-readable code can be as simple as a direction and a length of a line segment or can include other types of encoding such as QR codes or barcode elements. This type of discrete marking can also be integrated with more common continuous edge markings to make a unified system.

In order to read an imaging target, the first step is to locate the imaging targets in the environment, which may be cluttered, making it difficult for an automated system to find the imaging target in the background. The present description solves this problem by using a passive marker, such as a retro-reflective border around the machine-readable code, and a lighting process that enables a simple image processing differencing step to find an imaging target in a cluttered environment. Once an imaging target is found, the system zooms the imaging device in on the imaging target and the machine-readable code is read/decoded by a scanning application.

Existing digital pheromone concepts require an independent localization process (with external location sensing hardware, such as motion capture) in order to make the connection to the data. That is problematic, since the location element is sometimes challenging to acquire. The present description embeds both location and navigation data into the same reference item without the need for external navigation hardware. The process of localization relates to determining the position and orientation (location) of a mobile platform relative to a reference location, and the process of navigation relates to going to a specific place or traveling along a specific direction vector. Other existing systems need some level of programming to perform a navigation task; at the very least, a program needs to be loaded into the robot. The robot then needs some type of tracking system that provides coordinate information with respect to the environment in which it is operating. These issues with conventional navigation make it challenging to use general purpose robots.

According to the present description, the environment is set up with some type of low-cost passive imaging tags (QR codes, etc.) that contain both their current location and vector information (i.e. local navigation directions) pointing to the next imaging tag, and if applicable, the previous imaging tag, then robots could be programmed with much simpler instructions. So instead of turn-by-turn commands, robots could be instructed with just high-level commands (such as "go to room 123"). During operation, a robot is placed anywhere in the environment. The robot would read the first imaging tag that it finds, and then use the imaging tag's embedded direction information to point it at the next imaging tag, which then points to the next one, and so on.

Navigation vector data includes, but is not limited to, two main types of vector field formats: (1) the direction vector form; and (2) the velocity vector form. The direction vector form encodes distance in a magnitude of a vector, and the velocity vector form encodes speed in a magnitude of a vector. It is also possible to include both forms in the same imaging tag with additional fields, such a travel time. Encoding the format type in the imaging tag is also a useful addition. This approach enables robots (and other mobile platforms or applications) to find and read location specific data that can be used as part of a general-purpose navigation process. It provides a way to eliminate detailed path programming and re-programming, and it is much more flexible than buried wire navigation systems.

An exemplary process for initially finding imaging tags in cluttered environments involves the use of retro-reflective borders around the imaging tags, and acquisition of two images: one with and the other without an illumination device (such as a ring light). An image differencing technique is used to find a border and direct the imaging device to zoom-in on the imaging tag and take a close-up shot of the machine-readable code, and then decode the payload of the machine-readable code.

Another feature includes that imaging tags also provide a way for the system to re-align with the path and re-calibrate distance sensors, thus providing robust and accurate robotic vehicle tracking, along with simplified user interaction.

In yet another feature, the system is setup to request/receive feedback, and used as part of a finite state machine. Thus, the process enables the system to operate as a finite state machine, which may be enhanced by other sensors and/or actuators co-located with the target to provide additional feedback.

In yet another feature, velocity and acceleration values are integrated into the imaging tag payload.

In yet another feature, multiple imaging tag codes on each marker are available for different trips along the same path.

In yet another feature, imaging tags are dynamic, updated from a remote location to route vehicles around problems (detours), or stop traffic while a problem is cleared. This makes the entire environment of the system easily reconfigurable for robotic guidance, such as on a modular manufacturing floor.

Accordingly, the present description enables a new type of robotic navigation particularly useful to, for example, companies involved in automated manufacturing and factory applications. The systems and methods of the present description could also be used for entertainment and game applications used by people with hand-held devices (smartphones). Another potential application is driverless rides or people-movers, such as in a large plant or wild animal park, or a part/package courier system in a factory.

In an aspect, the present description enables a simpler type of robotic navigation in factories for manufacturing and warehouse applications, such as automated part or package delivery. Particular value is obtainable in cost avoidance related to robotic localization and navigation in the reduction of time, complexity, programming errors related to conventional methods. The present description is an alternative solution to buried-wire automated guide vehicle (AGV) systems used in factories.

Another feature includes enabling path configurations, e.g. one-way, continuous cycle, reverse direction (round trip), branches, multiple imaging tag codes for multiple paths.

Figure 7A:
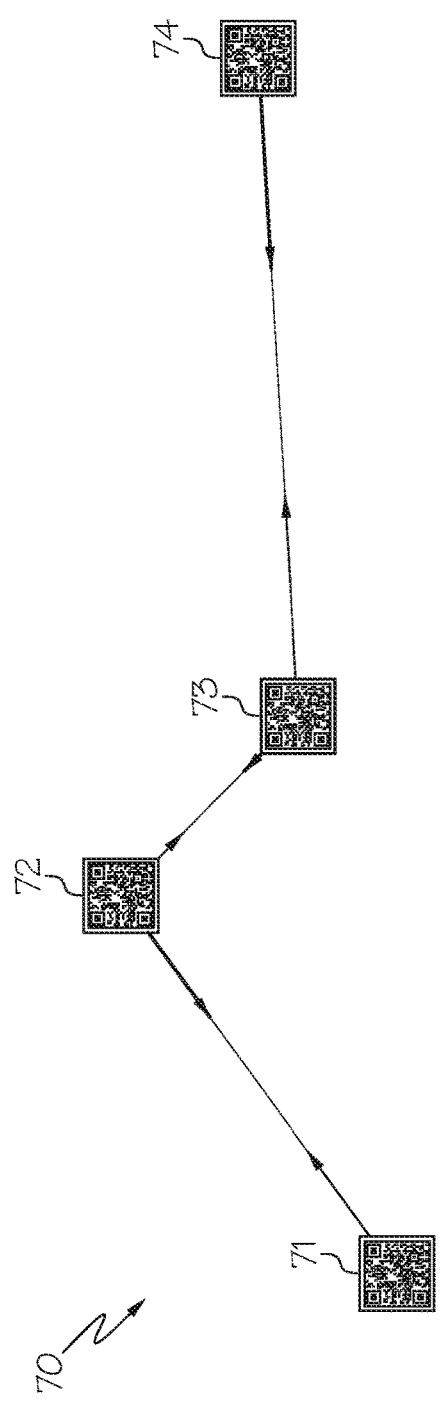
FIGS. 7A and 7B illustrate a round trip path configuration of imaging tags according to an exemplary embodiment of the present description.
Figure 7B:
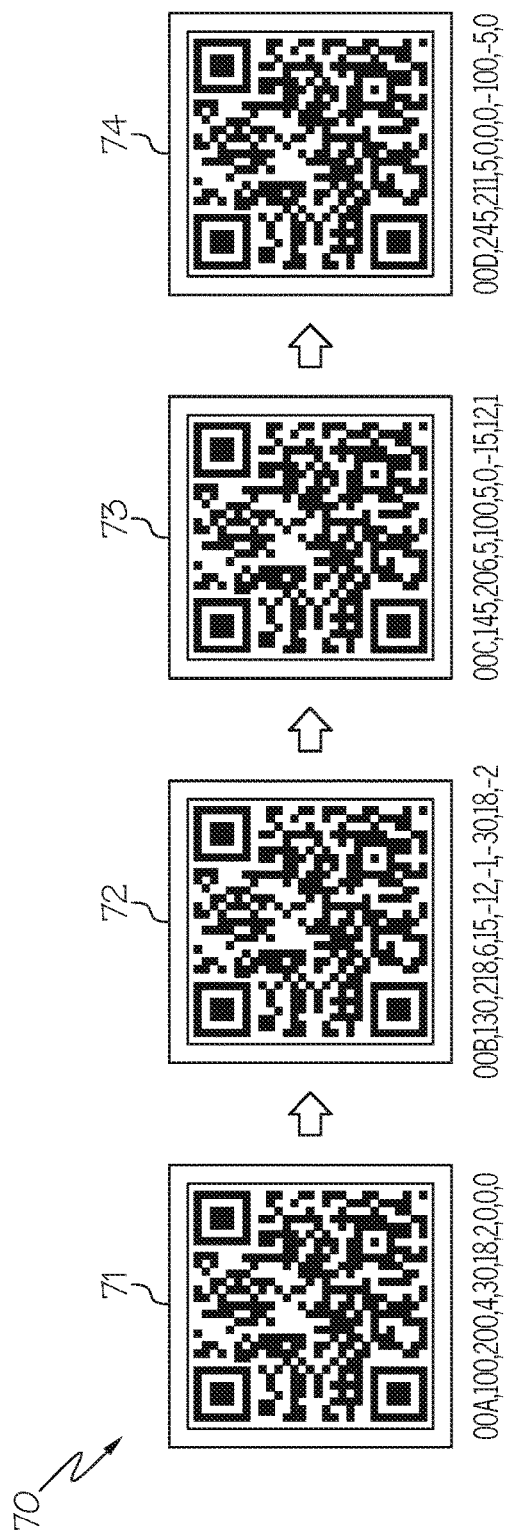

FIGS. 7A and 7B illustrate a round trip path configuration 70 of imaging tags 71, 72, 73, and 74 according to an exemplary embodiment of the present description. As illustrated, in one embodiment, each imaging tag includes a machine-readable code bounded by a retro-reflective passive marker, in which a payload of the machine-readable code includes: a unique identifier string; x-, y-, and z-coordinates corresponding to a current location of the imaging tag; a direction vector to the next target; and a direction vector to the previous target. In another embodiment, each imaging tag includes a machine-readable code bounded by a retro-reflective passive marker, in which a payload of the machine-readable tag includes: a unique identifier string, x-, y-, and z-coordinates corresponding to a current location of the imaging tag; x-, y-, and z-coordinates corresponding to a next imaging tag; and x-, y-, and z-coordinates corresponding to a previous imaging tag, wherein the direction vector data is then computed by the system from the 3D difference between the current location and the next or previous location data. When a mobile platform extracts data from the machine-readable code of imaging tag 71, the mobile platform may determine whether the unique identifier string corresponds to desired navigation path, calibrate a location of the mobile platform with the current location coordinates of the imaging tag 71, and navigate the mobile platform based on navigation vector data corresponding to a location of the next imaging tag 72. When the mobile platform reaches imaging tag 72, the process is repeated until the mobile platform reaches a destination. In the case of a round trip, the mobile platform may reach 74, at which the mobile platform may perform a task or wait for further instructions, and then return to imaging tag 71 via imaging tag 73 and imaging tag 72.

Figure 8A:
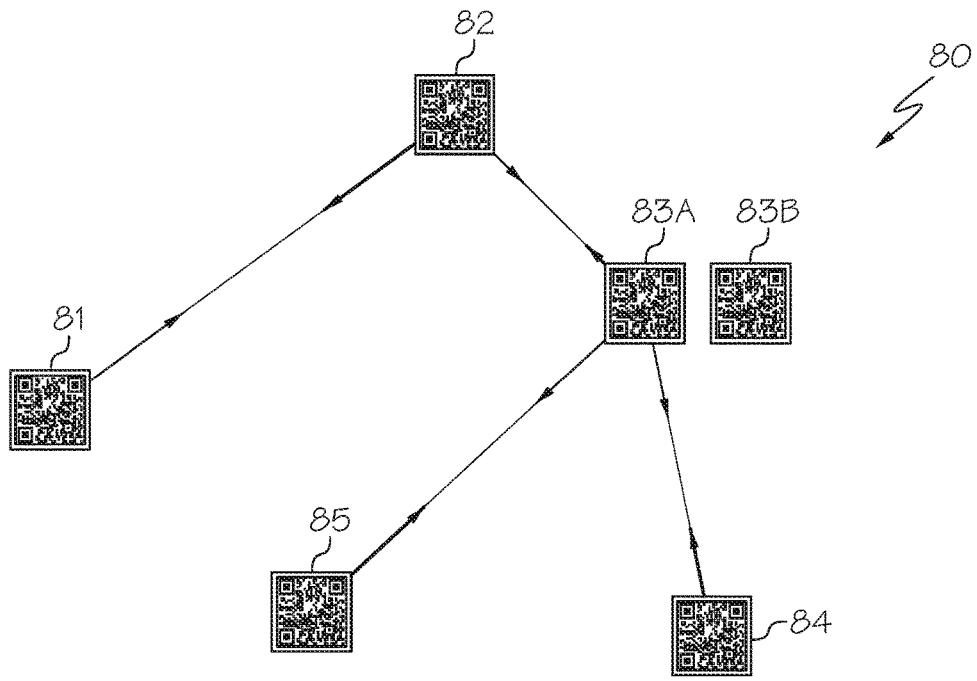
FIGS. 8A and 8B illustrate a branching trip path configuration of imaging tags according to an exemplary embodiment of the present description.
Figure 8B:
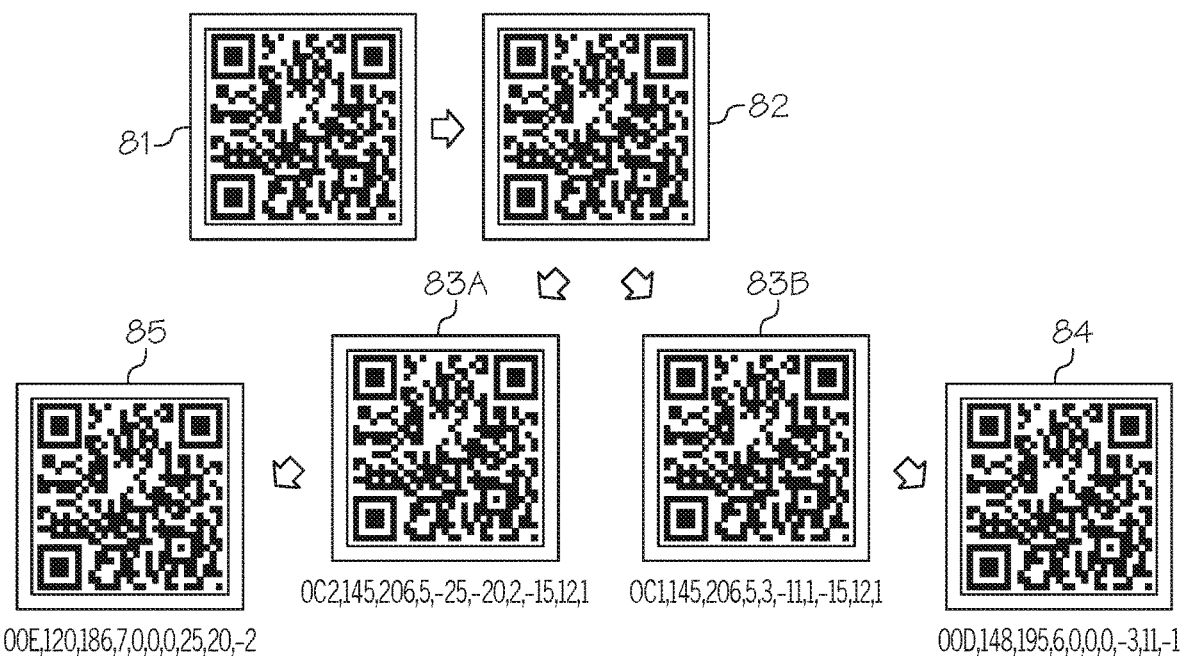
Figure 9:
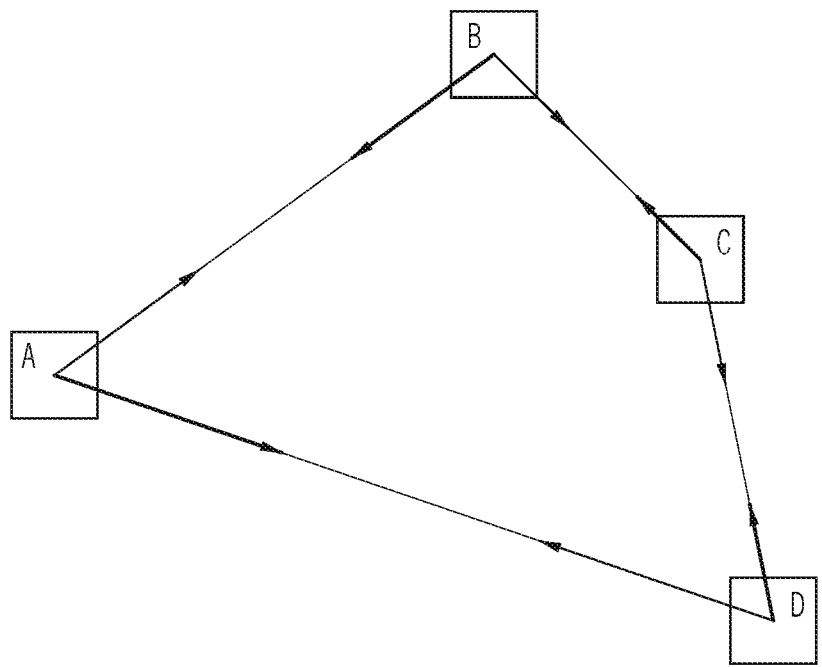
FIG. 9 illustrates a continuous cycle path configuration of imaging tags according to an exemplary embodiment of the present description.
Figure 10:
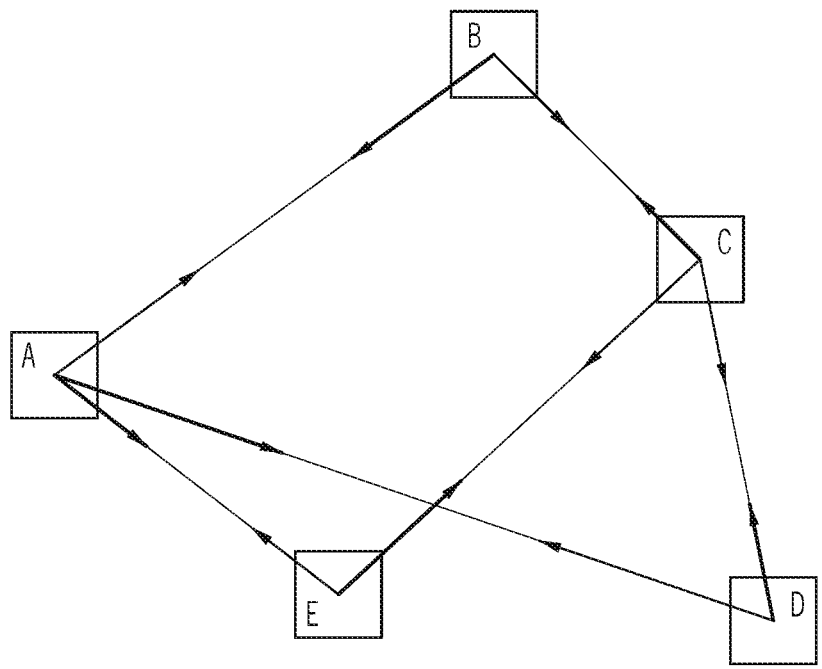
FIG. 10 illustrates a branching cycle path configuration of imaging tags according to an exemplary embodiment of the present description.

FIGS. 8A and 8B illustrate a branching trip path configuration 80 of imaging tags 81, 82, 83A, 83B, 84 and 85 according to an exemplary embodiment of the present description. As illustrated, each imaging tag includes a machine-readable code bounded by a retro-reflective passive marker, in which a payload of the machine-readable includes: a unique identifier string, x-, y-, and z-coordinates corresponding to a current location of the imaging tag; a direction vector to the next target; and a direction vector to the previous target. In another embodiment, each imaging tag includes a machine-readable code bounded by a retro-reflective passive marker, in which a payload of the machine-readable tag includes: a unique identifier string, x-, y-, and z-coordinates corresponding to a current location of the imaging tag; x-, y-, and z-coordinates corresponding to a next imaging tag; and x-, y-, and z-coordinates corresponding to a previous imaging tag, wherein the direction vector data is then computed by the system from the 3D difference between the current location and the next or previous location data. When a mobile platform extracts data from the machine-readable code of imaging tag 81, the mobile platform may determine whether the unique identifier string corresponds to desired navigation path, calibrate a location of the mobile platform with the current location coordinates of the imaging tag 81, and navigate the mobile platform based on navigation vector data corresponding to a location of the next imaging tag 82. When the mobile platform reaches imaging tag 82, the process is repeated until the mobile platform reaches imaging tags 83A and 83B, at which the mobile platform determines whether the unique identifier string of each of 83A and 83B corresponds to desired navigation path, and then navigate the mobile platform based on navigation vector data corresponding to one of imaging tag 83A and 83B, and the process is repeated until the mobile platform reaches a destination FIGS. 9 and 10 represent a continuous cycle of imaging tags and a branching continuous cycle of imaging tags, respectively, according to embodiments of the present description. However, it would be understood that the variation of path configurations is not limited to the illustrated path configurations.

Figure 11A:
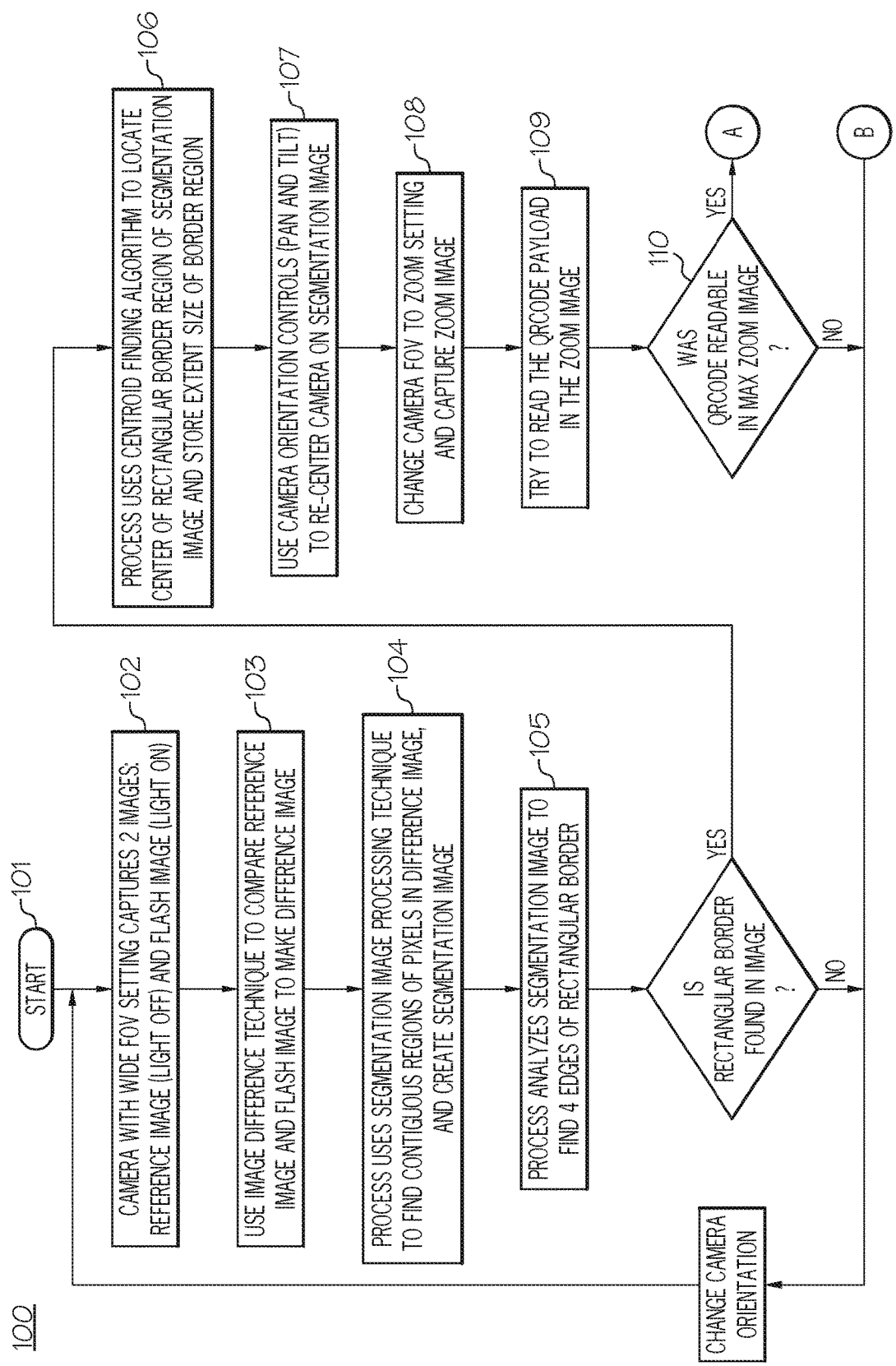

Referring now to FIGS. 11A and 11B, a flowchart 100 is illustrated. The flowchart 100 shows instructions as set forth and executed by at least one or more computing devices that may be communicatively coupled to one or more processing devices. Hence, when directed by the computing device, the system may then perform the instructions as set forth in flowchart 100 of FIGS. 11A and 11B.

Referring to block 101, the system initially sets the imaging device (e.g. camera) to aim at a surface of an object with a wide field-of-view angle. Since imaging targets may be located anywhere in the environment, the system may have to go through a process (see FIGS. 6A to 6C) before being able to fully locate and capture an imaging target.

Referring to block 102, the system directs an imaging device to capture a first image of an imaging target located on a surface of an object in a non-illuminated state and a second image of an imaging target located on a surface of an object in an illuminated state.

In block 103, a difference image may be generated using the results of the captured first and second images from block 102.

In block 104, the difference image may be computed and then a segmentation process is run on the image to determine contiguous regions of pixels within the image.

Referring to block 105, the system, after segmentation of the difference image, may locate the 4 edges of the rectangular border. If a rectangular border is not found, the system changes an orientation of the imaging device to continue searching for a valid imaging target.

Referring to block 106, the computing device locates a center point of each of the plurality of imaging targets to further extract information.

The imaging device may instruct the pan-tilt mechanism to aim the imaging device at the center region of one of the imaging targets (block 107), zoom in on that imaging and acquire a close-up image of the imaging target (block 108).

Referring to block 109, information may be extracted from a machine-readable payload located in the central region of each imaging target. Each imaging target may include a QR code, Data Matrix (DM), other two-dimensional (2D) code, barcode, other one-dimensional (1D) code, or other code of similar functionality that may be machine-readable or understood by a computer. The machine-readable code contains position data related to the position of the imaging target and may be used to help the computing device calibrate the location of the mobile platform. The machine-readable code also contains navigation vector data corresponding to a direction of a destination or next imaging tag. The machine-readable code may also contain additional information. For example, the machine-readable code may contain orientation information, part number, information on whether the object has been serviced, damage information, contact information (email, web site, etc.), or other information related to the part or location on the target object.

Referring to block 110, the system determines whether the extracted information from the acquired close-up image contains a valid machine-readable label. If the machine-readable label is not decodable into a usable format or cannot be read by the system, then the system may return back to block 101 and repeat the search process of finding valid imaging targets. If the machine-readable label can be read by the system, then the system may continue on to block 111.

Referring to block 111, the system determines whether the extracted information from the acquired close-up image matches the position format. If the machine-readable label does not match a position format corresponding to a desired navigation destination, then the system may return back to block 101 and repeat the search process of finding valid imaging targets. If the position format is matched, then the system may continue on to block 112.

In block 112, the system navigations the mobile platform according to navigation direction vector data extracted from the valid machine-readable code of an imaging target corresponding to a desired navigation destination.

Figure 12:
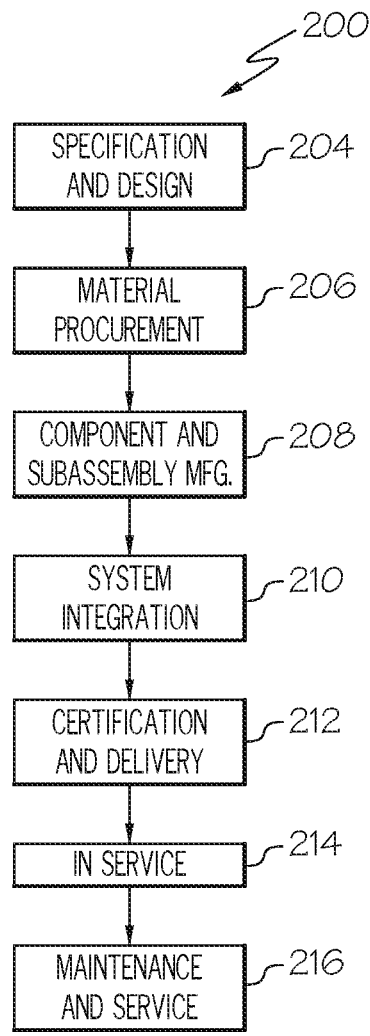
FIG. 12 is flow diagram of an aircraft manufacturing and service methodology.
Figure 13:
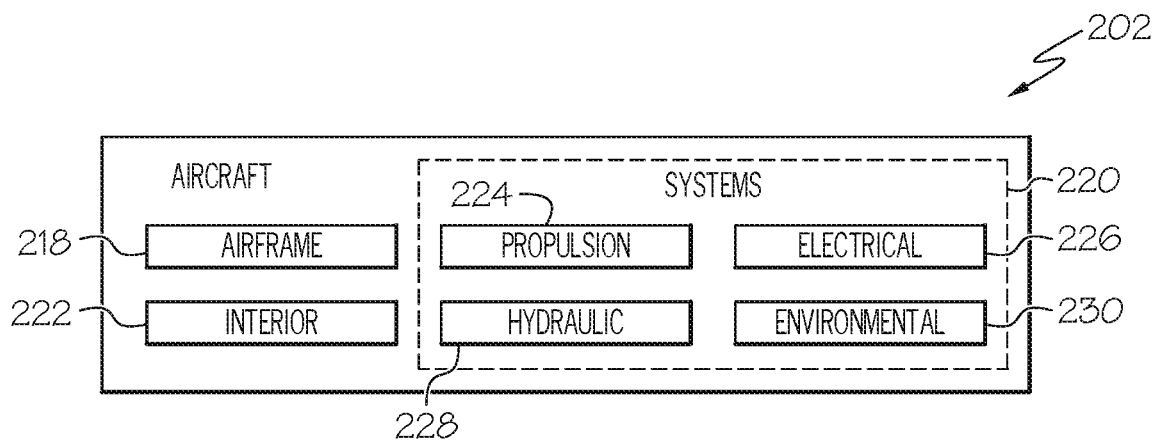
FIG. 13 is a block diagram of an aircraft.

Examples of the present disclosure may be described in the context of an aircraft manufacturing and service method 200, as shown in FIG. 12, and an aircraft 202, as shown in FIG. 13. During pre-production, the aircraft manufacturing and service method 200 may include specification and design 204 of the aircraft 202 and material procurement 206. During production, component/subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216, which may also include modification, reconfiguration, refurbishment and the like.

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The system and method of the present disclosure may be employed during any one or more of the stages of the aircraft manufacturing and service method 200, including specification and design 204 of the aircraft 202, material procurement 206, component/subassembly manufacturing 208, system integration 210, certification and delivery 212, placing the aircraft in service 214, and routine maintenance and service 216.

As shown in FIG. 13, the aircraft 202 produced by example method 200 may include an airframe 218 with a plurality of systems 220 and an interior 222. Examples of the plurality of systems 220 may include one or more of a propulsion system 224, an electrical system 226, a hydraulic system 228, and an environmental system 230. Any number of other systems may be included. The system and method of the present disclosure may be employed for any of the systems of the aircraft 202, including the airframe 218 and the interior 222.

Although various embodiments of the disclosed system and method for navigating a mobile platform through an environment to a destination have been shown and described, modifications may occur to those skilled in the art upon reading the specification. The present application includes such modifications and is limited only by the scope of the claims.

What is claimed is:

1. A method for navigating a sensor-equipped mobile platform through an environment, the method comprising:
    capturing a first image in a first state of illumination;
    capturing a second image in a second state of illumination;
    generating a first difference image from the first image and the second image;
    locating a first imaging target based on the first difference image, the first imaging target including a first machine-readable code embedded therein, the first embedded machine-readable code including first navigation vector data indicating a first navigation direction from the first imaging target to a second imaging target and at least one of a first distance, first velocity and first travel time from the first imaging target to the second imaging target;
    decoding the first machine-readable code by an imaging device, wherein the imaging device decodes the first machine-readable code and extracts the first navigation vector data from a first payload region of the first machine-readable code, wherein the first navigation direction and the at least one of the first distance, first velocity and first travel time are obtained by the imaging device from the first imaging target;
    sending the extracted first navigation vector data from the imaging device to a computing device for use in directing a navigation of the mobile platform;
    directing the navigation of the mobile platform to the second imaging target using the first navigation direction and the at least one of the first distance, first velocity and first travel time obtained from the first imaging target;
    capturing a third image in a third state of illumination;
    capturing a fourth image in a fourth state of illumination;
    generating a second difference image from the third image and the fourth image;
    locating the second imaging target based on the second difference image, the second imaging target including a second machine-readable code embedded therein, the second embedded machine-readable code including second navigation vector data indicating a second navigation direction from the second imaging target to a destination and at least one of a second distance, second velocity and second travel time from the second imaging target to the destination;
    decoding the second machine-readable code by the imaging device, wherein the imaging device decodes the second machine-readable code and extracts the second navigation vector data from a second payload region of the second machine-readable code, wherein the second navigation direction and the at least one of the second distance, second velocity and second travel time are obtained by the imaging device from the second imaging target;

sending the extracted second navigation vector data from the imaging device to the computing device for use in directing the navigation of the mobile platform; and directing the navigation of the mobile platform to the destination using the second navigation direction and the at least one of the second distance, second velocity and second travel time obtained from the second imaging target.

2. The method of claim 1 wherein one of the first state of illumination and the second state of illumination is an off state, and wherein the other of the first state of illumination and the second state of illumination is an on state.

3. The method of claim 1 wherein one of the third state of illumination and the fourth state of illumination is an off state, and wherein the other of the third state of illumination and the fourth state of illumination is an on state.

4. The method of claim 1 wherein the first imaging target includes a first passive marker.

5. The method of claim 4 wherein the first passive marker includes a first retro-reflective passive marker.

6. The method of claim 4 wherein the first imaging target is located based on a difference in an appearance of the first passive marker in the first state of illumination and the appearance of the first passive marker in the second state of illumination.

7. The method of claim 1 wherein the second imaging target includes a second passive marker.

8. The method of claim 7 wherein the second passive marker includes a second retro-reflective passive marker.

9. The method of claim 7 wherein the second imaging target is located based on a difference in an appearance of the second passive marker in the third state of illumination and the appearance of the second passive marker in the fourth state of illumination.

10. The method of claim 1 wherein said first machine-readable code is a QR code.

11. The method of claim 1 wherein said second machine-readable code is a QR code.

12. A system for navigating a mobile platform through an environment, comprising:
a first imaging target at a first location and a second imaging target at a second location,
wherein the first imaging target includes a first machine-readable code embedded therein, the first embedded machine-readable code including first navigation vector data indicating a first navigation direction from the first imaging target to the second imaging target and at least one of a first distance, first velocity and first travel time from the first imaging target to the second imaging target, and
wherein the second imaging target includes a second machine-readable code embedded therein, the second embedded machine-readable code including second navigation vector data indicating a second navigation direction from the second imaging target to a destination and at least one of a second distance, second velocity and second travel time from the second imaging target to the destination; and
a mobile platform comprising an imaging device and a computing device, said computing device configured to:
capture a first image in a first state of illumination;
capture a second image in a second state of illumination;
generate a first difference image from the first image and the second image;
locate the first imaging target based on the first difference image, the first imaging target including a first machine-readable code embedded therein, the first embedded machine-readable code including the first navigation vector data indicating the first navigation direction from the first imaging target to the second imaging target and at least one of the first distance, the first velocity and the first travel time from the first imaging target to the second imaging target;
decode the first machine-readable code by the imaging device, wherein the imaging device decodes the first machine-readable code and extracts the first navigation vector data from a first payload region of the first machine-readable code, wherein the first navigation direction and the at least one of the first distance, first velocity and first travel time are obtained by the imaging device from the first imaging target;
send the extracted first navigation vector data from the imaging device to the computing device for use in directing a navigation of the mobile platform;
direct the navigation of the mobile platform to the second imaging target using the first navigation direction and the at least one of the first distance, first velocity and first travel time obtained from the first imaging target;
capture a third image in a third state of illumination;
capture a fourth image in a fourth state of illumination;
generate a second difference image from the third image and the fourth image;
locate the second imaging target based on the second difference image, the second imaging target including the second machine-readable code embedded therein, the second embedded machine-readable code including the second navigation vector data indicating the second navigation direction from the second imaging target to the destination and at least one of the second distance, the second velocity and the second travel time from the second imaging target to the destination;
decode the second machine-readable code by the imaging device, wherein the imaging device decodes the second machine-readable code and extracts the second navigation vector data from a second payload region of the second machine-readable code, wherein the second navigation direction and the at least one of the second distance, second velocity and second travel time are obtained by the imaging device from the second imaging target;
send the extracted second navigation vector data from the imaging device to the computing device for use in directing the navigation of the mobile platform; and
direct the navigation of the mobile platform to the destination using the second navigation direction and the at least one of the second distance, second velocity and second travel time obtained from the second imaging target.

13. The system of claim 12 wherein said mobile platform further comprises an illumination device.

14. The system of claim 12 wherein the first imaging target includes a first passive marker.

15. The system of claim 14 wherein the first passive marker includes a first retro-reflective passive marker.

16. The system of claim 14 wherein the first imaging target is located based on a difference in an appearance of the first passive marker in the first state of illumination and the appearance of the first passive marker in the second state of illumination.

17. The system of claim 12 wherein the second imaging target includes a second passive marker.

18. The system of claim 17 wherein the second passive marker includes a second retro-reflective passive marker.

19. The system of claim 12 wherein said first machine-readable code is a QR code.

20. The system of claim 12 wherein said second machine-readable code is a QR code.

* * * * *